(12) United States Patent
Yoshida et al.

(10) Patent No.: US 11,876,245 B2
(45) Date of Patent: Jan. 16, 2024

(54) SEALED BATTERY COMPRISING AN ELASTIC DEFORMATION PART THAT IS FOLDED

(71) Applicant: SANYO Electric Co., Ltd., Daito (JP)

(72) Inventors: Masayoshi Yoshida, Osaka (JP); Oose Okutani, Hyogo (JP); Takahiro Nogami, Osaka (JP); Akira Takano, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 315 days.

(21) Appl. No.: 17/415,046

(22) PCT Filed: Dec. 2, 2019

(86) PCT No.: PCT/JP2019/047082
§ 371 (c)(1),
(2) Date: Jun. 17, 2021

(87) PCT Pub. No.: WO2020/137372
PCT Pub. Date: Jul. 2, 2020

(65) Prior Publication Data
US 2022/0069408 A1 Mar. 3, 2022

(30) Foreign Application Priority Data
Dec. 28, 2018 (JP) .................... 2018-246385

(51) Int. Cl.
*H01M 50/325* (2021.01)
*H01M 50/107* (2021.01)
(Continued)

(52) U.S. Cl.
CPC ....... *H01M 50/325* (2021.01); *H01M 50/107* (2021.01); *H01M 50/147* (2021.01);
(Continued)

(58) Field of Classification Search
CPC ............ H01M 50/325; H01M 50/107; H01M 50/531; H01M 50/184; H01M 50/188; H01M 50/191
See application file for complete search history.

(56) References Cited

U.S. PATENT DOCUMENTS

| 5,418,082 A | 5/1995 | Taki et al. |
| 2009/0087724 A1* | 4/2009 | Kim ................... H01M 50/171 429/82 |

(Continued)

FOREIGN PATENT DOCUMENTS

| CN | 104488113 A | 4/2015 |
| JP | H09-134715 A | 5/1997 |

(Continued)

OTHER PUBLICATIONS

Office Action dated Sep. 19, 2022, issued in counterpart CN application No. 201980081367.1, with English translation. (9 pages).

(Continued)

*Primary Examiner* — Christopher P Domone
*Assistant Examiner* — Kimberly Wyluda
(74) *Attorney, Agent, or Firm* — WHDA, LLP (57) ABSTRACT

A sealed battery including a battery case that includes a cylindrical exterior can having a bottom and an opening sealing body that closes an opening of the outer can; a gasket that is arranged between the exterior can and the opening sealing body; and an electrode body. The opening sealing body includes: a metal plate with an annular part to which an electrode lead is electrically connected, and a disconnecting part that is separated from the annular part when the inner pressure of the battery case exceeds a predetermined threshold; a valve body that is arranged further to the outside of the battery case than the metal plate; and an insulating plate that is arranged between the metal plate and the valve body. The insulating plate or the gasket is provided with an (Continued)

elastic deformation part that deforms in the direction of the valve body.

4 Claims, 5 Drawing Sheets

(51) Int. Cl.
| | |
|---|---|
| *H01M 50/531* | (2021.01) |
| *H01M 50/184* | (2021.01) |
| *H01M 50/188* | (2021.01) |
| *H01M 50/191* | (2021.01) |
| *H01M 50/147* | (2021.01) |
| *H01M 50/593* | (2021.01) |
| *H01M 50/586* | (2021.01) |
| *H01M 50/186* | (2021.01) |

(52) U.S. Cl.
CPC ....... *H01M 50/184* (2021.01); *H01M 50/186* (2021.01); *H01M 50/188* (2021.01); *H01M 50/191* (2021.01); *H01M 50/531* (2021.01); *H01M 50/586* (2021.01); *H01M 50/593* (2021.01)

(56) References Cited

U.S. PATENT DOCUMENTS

| | | | |
|---|---|---|---|
| 2015/0243960 A1 | 8/2015 | Imanishi et al. | |
| 2017/0294641 A1* | 10/2017 | Lee | H01M 50/3425 |
| 2018/0062124 A1 | 3/2018 | Kohira et al. | |
| 2019/0103625 A1 | 4/2019 | Haraguchi et al. | |
| 2022/0115756 A1* | 4/2022 | Yoshida | H01M 50/152 |

FOREIGN PATENT DOCUMENTS

| | | |
|---|---|---|
| JP | H11-111264 A | 4/1999 |
| JP | 2000-3700 A | 1/2000 |
| JP | 2012-174563 A | 9/2012 |
| JP | 2014-116277 A | 6/2014 |
| JP | 2017-529659 A | 10/2017 |
| WO | 2016/157750 A1 | 10/2016 |
| WO | 2017/164000 A1 | 9/2017 |

OTHER PUBLICATIONS

International Search Report dated Feb. 10, 2020, issued in counterpart application No. PCT/JP2019/047082, with English translation. (4 pages).
The Extended European Search Report dated Jan. 27, 2022, issued in counterpart EP Application No. 19901601.5. (10 pages).

* cited by examiner

SEALED BATTERY COMPRISING AN ELASTIC DEFORMATION PART THAT IS FOLDED

TECHNICAL FIELD

The present disclosure relates to a sealed battery.

BACKGROUND ART

There is conventionally widely known a sealed battery comprising a battery case including a bottomed tubular exterior can and a sealing assembly sealing an opening of the exterior can (for example, refer to PATENT LITERATURE 1). PATENT LITERATURE 1 discloses a sealing assembly which includes a metal plate electrically connected to an electrode assembly, and a vent member arranged more on the outside of the battery case than the metal plate and electrically connected to the metal plate and which is configured such that the vent member inverts so as to be convex toward the outside to block electric conduction between the vent member and the metal plate when the internal pressure of the battery case rises.

CITATION LIST

Patent Literature

PATENT LITERATURE 1: Japanese Unexamined Patent Application Publication No. 2000-3700

SUMMARY

Technical Problem

There is however a possibility, for the sealing assembly disclosed in PATENT LITERATURE 1, that after the electric conduction between the vent member and the metal plate is blocked, recontact between the vent member and the metal plate occurs and causes reconduction therebetween. It is therefore needed, for example, to enlarge the amount of deformation of the vent member through its inversion to prevent the reconduction. Namely, designed dimensional leeway of the vent member needs to be estimated on the amount of deformation thereof.

Solution to Problem

A sealed battery which is an aspect of the present disclosure comprises: a battery case including a bottomed tubular exterior can, and a sealing assembly sealing an opening of the exterior can; a gasket arranged between the exterior can and the sealing assembly; and an electrode assembly including an electrode lead and housed in the battery case, in which the sealing assembly includes a metal plate including an annular part that the electrode lead is electrically connected to, and a separation part that is to be separated from the annular part when an internal pressure of the battery case exceeds a predetermined threshold, a vent member that is arranged more on an outside of the battery case than the metal plate and is connected to the separation part, and an insulating plate that is arranged between the metal plate and the vent member and insulates the metal plate and the vent member from each other except for a connection portion between them, and an elastic deformation part that is to deform in a direction toward the vent member when the separation part of the metal plate is separated from the annular part is provided in the insulating plate or the gasket.

Advantageous Effect of Invention

According to the sealed battery according to the present disclosure, it may be possible to reduce a possibility that after the vent member deforms due to a rise of the internal pressure of the battery case so as to block the electric conduction of the vent member with the metal plate, recontact between the vent member and the metal plate occurs to cause reconduction therebetween to occur. Moreover, designed dimensional leeway of structural components of the sealing assembly, such as the amount of deformation of the vent member, can be more expanded than conventional one.

DESCRIPTION OF EMBODIMENTS

Hereafter, an example of embodiments of the present disclosure will be described in detail. While there is hereafter exemplarily illustrated, as an example of embodiments of a sealed battery according to the present disclosure, a cylindrical battery in which a winding-type electrode assembly 14 is housed in a cylindrical battery case 15, the battery may be a rectangular battery comprising a rectangular battery case. Moreover, the electrode assembly may be a laminate-type one configured by alternately laminating a plurality of positive electrodes and a plurality of negative electrodes via separators. In the present specification, the direction along the axial direction of the battery case 15 is taken as an "up-down direction", the side of a sealing assembly 17 of the battery case 15 is taken as being "upward", and the bottom part side of an exterior can 16 thereof is taken as being "downward" for convenience of description.

Figure 1:
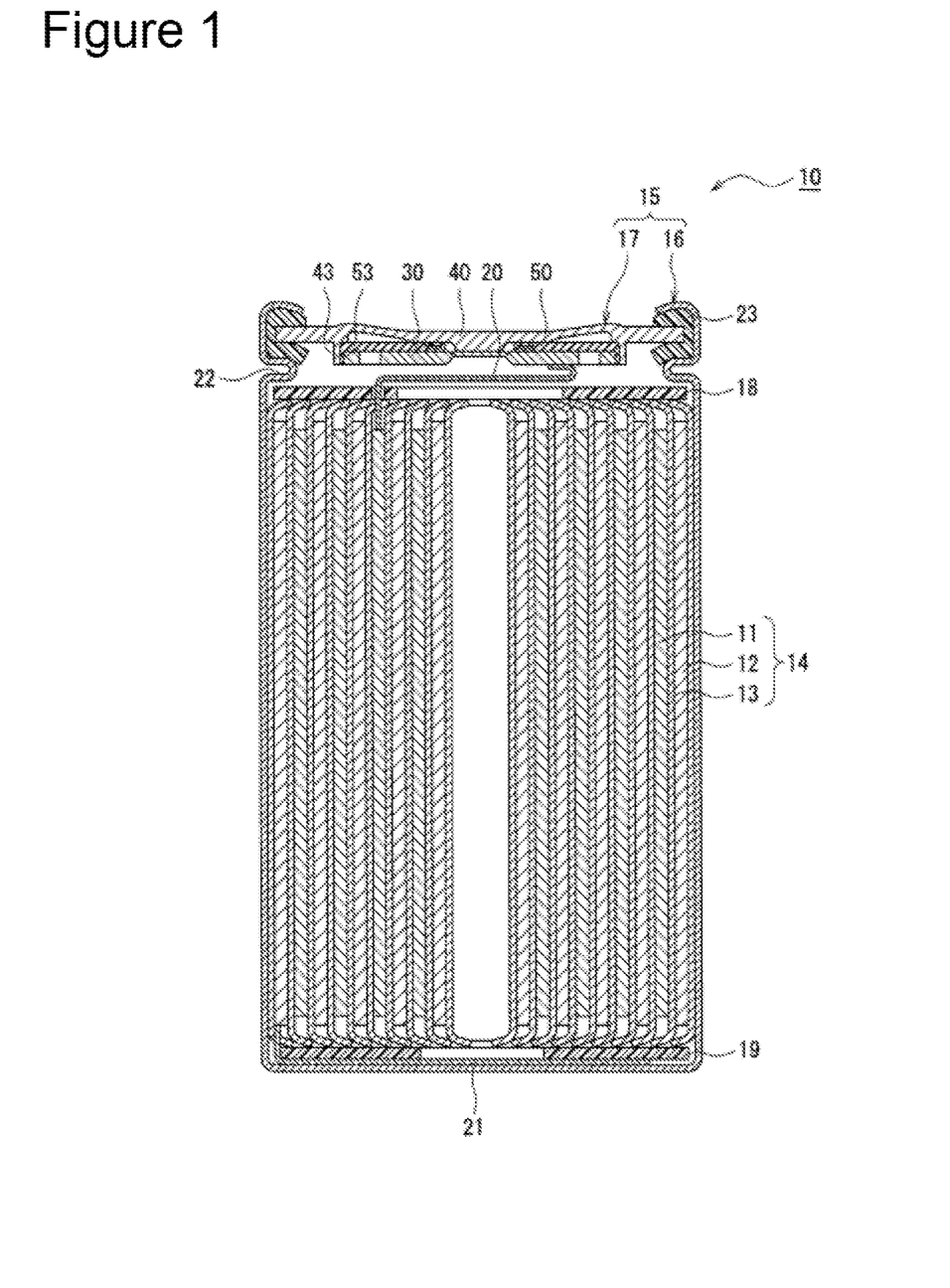
FIG. 1 is a sectional view of a sealed battery which is an example of embodiments.

FIG. 1 is a sectional view of a sealed battery 10 which is an example of the embodiments. As exemplarily shown in FIG. 1, the sealed battery 10 comprises: the battery case 15 including the bottomed tubular exterior can 16 and the sealing assembly 17 sealing an opening of the exterior can 16; a gasket 23 arranged between the exterior can 16 and the sealing assembly 17; the electrode assembly 14 including electrode leads and housed in the battery case 15. Moreover, an electrolyte is housed in the battery case 15. The electrode assembly 14 includes a positive electrode 11, a negative electrode 12, and separators 13 interposed between the positive electrode 11 and the negative electrode 12, and has a winding structure configured by winding the positive electrode 11 and the negative electrode 12 via the separators 13.

The electrolyte may be any of an aqueous electrolyte and a non-aqueous electrolyte. A preferable example of the sealed battery 10 is a non-aqueous electrolyte secondary battery, such as a lithium ion battery, using a non-aqueous electrolyte. The non-aqueous electrolyte includes, for example, a non-aqueous solvent and an electrolyte salt dissolved in the non-aqueous solvent. For the non-aqueous solvent, there are used esters, ethers, nitriles, amides, mixed solvents of two or more of these, and the like. The non-aqueous solvent may contain a halogen-substituted substance having halogen atom(s) such as fluorine substituted for at least one or some of hydrogens in these solvents. Notably, the non-aqueous electrolyte is not limited to a liquid electrolyte but may be a solid electrolyte using a gelatinous polymer or the like. For the electrolyte salt, there is used a lithium salt such as $LiPF_6$.

The electrode assembly 14 includes the positive electrode 11 which is long, the negative electrode 12 which is long, and the two separators 13 which are long. Moreover, the electrode assembly 14 includes, as the electrode leads, a positive electrode lead 20 joined to the positive electrode 11, and a negative electrode lead 21 joined to the negative electrode 12. In order to inhibit precipitation of lithium, the negative electrode 12 is formed in dimensions one size larger than those of the positive electrode 11. The two separators 13 are formed in dimensions one size larger, at least, than those of the positive electrode 11, and are arranged, for example, so as to interpose the positive electrode 11.

The positive electrode 11 includes a positive electrode current collector, and positive electrode mixture layers provided on both sides of the positive electrode current collector. For the positive electrode current collector, there can be used a foil of a metal such as aluminum and aluminum alloy, which is stable in the potential range of the positive electrode 11, a film having the metal disposed in its surface layers, or the similar material. The positive electrode mixture layer includes a positive electrode active material, a conductive agent such as acetylene black, and a binder such as polyvinylidene fluoride (PVdF). The positive electrode 11 can be produced by applying positive electrode mixture slurry including the positive electrode active material, the conductive agent, the binder, and the like onto the positive electrode current collector, and drying, and compressing afterward, the coating films to form the positive electrode mixture layers on both sides of the positive electrode current collector.

For the positive electrode active material, a lithium-transition metal composite oxide is used, for example. Examples of metal elements contained in the lithium-transition metal composite oxide include Ni, Co, Mn, Al, B, Mg, Ti, V, Cr, Fe, Cu, Zn, Ga, Sr, Zr, Nb, In, Sn, Ta, and W. A preferable example of the lithium-transition metal composite oxide is preferably a lithium-metal composite oxide containing at least one of the group consisting of Ni, Co, and Mn. Specific examples thereof include a composite oxide containing Ni, Co, and Mn, and a composite oxide containing Ni, Co, and Al.

The negative electrode 12 includes a negative electrode current collector, and negative electrode mixture layers provided on both sides of the negative electrode current collector. For the negative electrode current collector, there can be used a foil of a metal such as copper and copper alloy, which is stable in the potential range of the negative electrode 12, a film having the metal disposed in its surface layers, or the similar material. The negative electrode mixture layer includes a negative electrode active material, and a binder such as styrene-butadiene rubber (SBR). The negative electrode 12 can be produced by applying negative electrode mixture slurry including the negative electrode active material, the binder, and the like onto the negative electrode current collector, and drying, and compressing afterward, the coating films to form the negative electrode mixture layers on both sides of the negative electrode current collector.

For the negative electrode active material, there is used, for example, graphite such as natural graphite such as flaky graphite, lumpy graphite, and earthy graphite, artificial graphite such as artificial lumpy graphite, and graphitized mesophase carbon microbeads, or the similar material. For the negative electrode active material, there may be used a metal which is alloyed with lithium, such as Si and Sn, an alloy containing the metal, a compound containing the metal, or the like, and these may be used together with the graphite. Specific examples of the compound include silicon compounds expressed as $SiO_x$ ($0.5 \leq x \leq 1.6$).

Insulating plates 18 and 19 are arranged on the top and the bottom of the electrode assembly 14, respectively. In the example shown in FIG. 1, the positive electrode lead 20 attached to the positive electrode 11 extends to the sealing assembly 17 side through a through hole of the insulating plate 18, and the negative electrode lead 21 attached to the negative electrode 12 extends to the bottom part side of the exterior can 16 through the outside of the insulating plate 19. The positive electrode lead 20 is connected to the inner surface, of the battery case 15 of the sealing assembly 17, that faces the inside by welding or the like, and the sealing assembly 17 is a positive electrode external terminal. The negative electrode lead 21 is connected to the inner surface of the bottom part of the exterior can 16 by welding or the like, and the exterior can 16 is a negative electrode external terminal.

As mentioned above, the battery case 15 is constituted of the bottomed tubular exterior can 16 and the sealing assembly 17 sealing the opening of the exterior can 16. The exterior can 16 is a bottomed cylindrical metal-made container. The gasket 23 is provided between the exterior can 16 and the sealing assembly 17, seals the inner space of the battery case 15, and insulates the exterior can 16 and the sealing assembly 17 from each other. The exterior can 16 includes a grooved part 22 which is formed in its lateral surface part, for example, by spinning processing on the lateral surface part from the outside and supports the sealing assembly 17. The grooved part 22 is preferably formed into an annular shape along the circumferential direction of the exterior can 16, and supports the sealing assembly 17 on its upper surface. Moreover, the upper end part of the exterior can 16 is folded to the inside of the battery case 15 and crimped on the peripheral edge of the sealing assembly 17. The opening of the exterior can 16 has a circular shape in plan view, and likewise, the sealing assembly 17 also has a circular shape in plan view.

Figure 2:
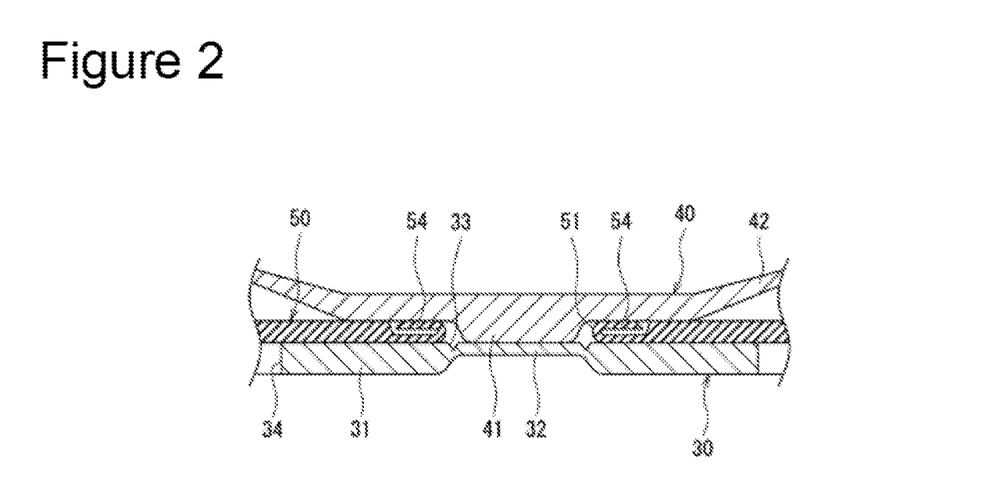
FIG. 2 is a sectional view of a sealing assembly which is an example of embodiments.
Figure 3:
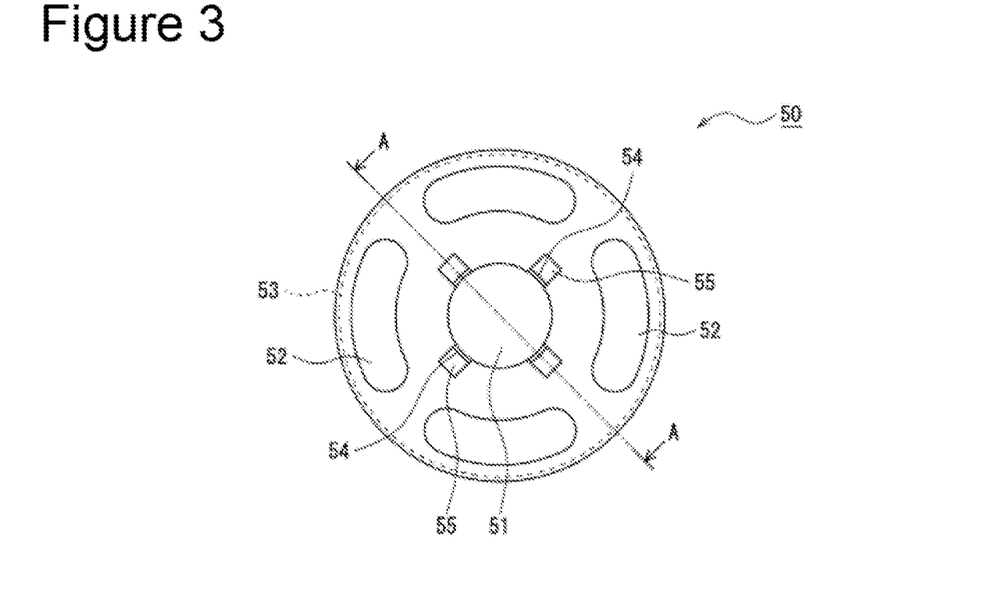
FIG. 3 is a plan view of an insulating plate constituting a sealing assembly which is an example of embodiments.
Figure 4:
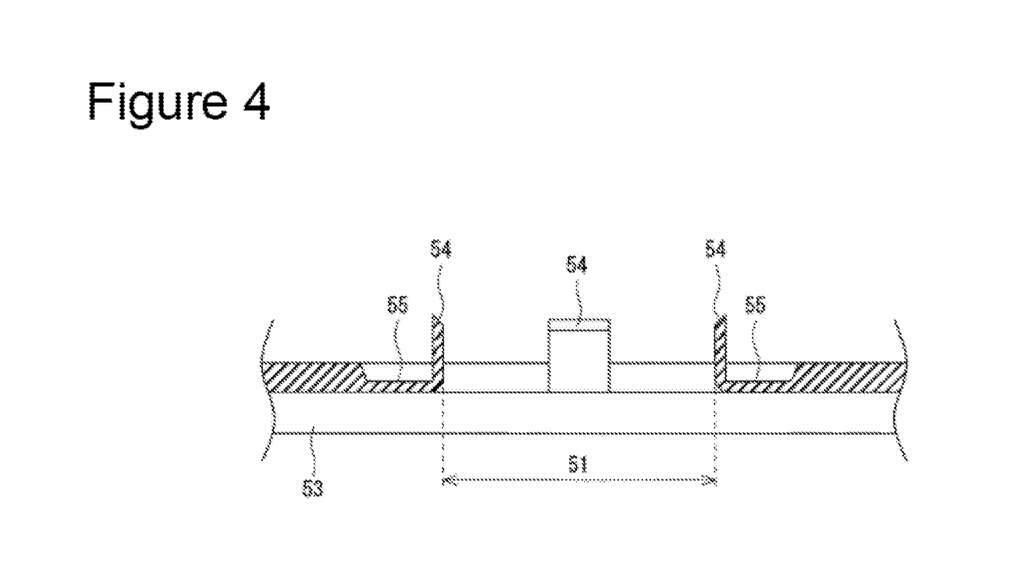
FIG. 4 is a sectional view taken along the AA line in FIG. 3.

Hereafter, the sealing assembly 17 will be described in detail further with reference to FIG. 2 to FIG. 4. FIG. 2 is a sectional view of the sealing assembly 17 and is a view having the center part of the sealing assembly 17 in the radial direction enlarged. FIG. 3 is a plan view of an insulating plate 50 constituting the sealing assembly 17, and FIG. 4 is a sectional view taken along the AA line in FIG. 3.

As exemplarily shown in FIG. 2, the sealing assembly 17 comprises an internal terminal plate 30, a vent member 40 arranged more on the outside of the battery case 15 than the internal terminal plate 30, and an insulating plate 50 arranged between the internal terminal plate 30 and the vent member 40. The sealing assembly 17 has, for example, a substantially perfect circular shape in plan view, and moreover, the internal terminal plate 30, the vent member 40, and the insulating plate 50 also have substantially perfect circular shapes in plan view. Herein, "substantially perfect circular" means to include a perfect circular shape and shapes which can be substantially recognized as a perfect circle.

The sealing assembly 17 has a structure in which the internal terminal plate 30, the insulating plate 50, and the vent member 40 are laminated in the order from the inside of the battery case 15 (electrode assembly 14 side). The internal terminal plate 30 is a metal plate including an annular part 31 which the positive electrode lead 20 is electrically connected to, and a separation part 32 which is to be separated from the annular part 31 when an internal pressure of the battery case 15 exceeds a predetermined threshold. The predetermined threshold is properly set based on a battery capacity, a use, and the like. Notably, the sealed battery 10 may have a structure in which the negative electrode lead 21 is connected to the annular part 31. In this case, the sealing assembly 17 is the negative electrode external terminal.

In the sealing assembly 17, the vent member 40 is arranged most outside and constitutes a top board, of the sealing assembly 17, to which an external lead (not shown) connected to an external device is connected. The vent member 40 is connected to the separation part 32 of the internal terminal plate 30 by welding or the like and is electrically connected to the internal terminal plate 30 in the normal state of use. Upon a rise of the internal pressure of the battery case 15, the vent member 40 is liable to deform so as to be convex toward the upside, and when the internal pressure exceeds the predetermined threshold, the internal terminal plate 30 connected to the vent member 40 fractures to cause the separation part 32 to be separated from the annular part 31. When the internal pressure further rises, the vent member 40 fractures to form a discharge port for gas. The insulating plate 50 is interposed between the annular part 31 of the internal terminal plate 30 and the vent member 40 and insulates the internal terminal plate 30 and the vent member 40 from each other except for a connection portion between them.

Mentioned later in detail, there is provided in the insulating plate 50 an elastic deformation part which is arranged in the state where pressing force acts on the vent member 40 toward the outside of the battery case 15 from the inside thereof and is to deform in a direction toward the vent member 40 when the annular part 31 of the internal terminal plate 30 is separated from the separation part 32. By providing the elastic deformation part in the insulating plate 50, there can be reduced a possibility that after deformation of the vent member 40 due to a rise of the internal pressure of the battery case 15 blocks electric conduction of the vent member 40 with the annular part 31 of the internal terminal plate 30 to which the positive electrode lead 20 is connected, recontact between the vent member 40 and the annular part 31 causes reconduction therebetween to occur. Moreover, as exemplarily shown in FIG. 6 and the like mentioned later, the elastic deformation part may be provided in a gasket.

The sealing assembly may include structural components other than the internal terminal plate 30 including the annular part 31 and the separation part 32, the vent member 40, and the insulating plate 50. For example, a metal plate to which an electrode lead is connected may be provided more on the electrode assembly side than the internal terminal plate 30. In this case, the metal plate functions as a terminal plate and the electrode lead is electrically connected to the annular part via the metal plate. Accordingly, the electrode lead is not necessarily directly connected to the internal terminal plate 30.

The internal terminal plate 30 is arranged to face the vent member 40, these interposing the insulating plate 50, and is connected to the vent member 40 at its center part in the radial direction by welding or the like. In the sealed battery 10, there is formed a current path connecting the electrode assembly 14 to an external lead by electrically connecting the internal terminal plate 30 to which the positive electrode lead 20 is connected and the vent member 40 to which the external lead is connected, in the normal state of use. The internal terminal plate 30 includes the separation part 32 connected to the vent member 40 at its center part in the radial direction. The annular part 31 encloses the separation part 32 and is formed in the outer part (outer periphery) of the internal terminal plate 30 in the radial direction. To the annular part 31, the positive electrode lead 20 is welded onto the lower surface thereof facing the electrode assembly 14 side.

In the present embodiment, an annular groove 33 is formed at the boundary position between the annular part 31 and the separation part 32. While in the example shown in FIG. 2, the groove 33 is formed on the upper surface, of the internal terminal plate 30, that faces the vent member 40 side, the groove 33 may be formed on the lower surface of the internal terminal plate 30 (refer to FIG. 6 mentioned later). The portion, of the internal terminal plate 30, where the groove 33 is formed is a thin part having a thickness smaller than the other portions thereof and works as an easily fracturing part which takes priority in fracturing when the internal pressure of the battery case 15 rises. The groove 33 is preferably formed into an annular shape that has no corners, particularly preferably formed into a substantially perfect circular shape.

The internal terminal plate 30 is, for example, constituted of one metal plate including the annular part 31 and the separation part 32 which are sectioned with the annular groove 33. A preferable example of the metal plate is an aluminum alloy plate the main component of which is aluminum. Since the annular part 31 is a portion to which the positive electrode lead 20 is connected by welding or the like, it is preferably formed to be thicker than the separation part 32. The lower surface of the internal terminal plate 30 has a shape in which its center part in the radial direction where the separation part 32 is formed is recessed toward the upside. In the annular part 31, there are formed vent holes 34 which are openings penetrating the internal terminal plate 30 in the thickness direction. While in FIG. 2, vent holes 52 of the insulating plate 50 which are to be mentioned later are not illustrated, the internal terminal plate 30 and the insulating plate 50 are preferably arranged such that at least parts of the vent holes 34 and 52 overlap with each other in the up-down direction.

The vent member 40 includes a downward projection 41 which is convex toward the internal terminal plate 30 side at its center part in the radial direction. The downward projection 41 is connected to the separation part 32 of the internal terminal plate 30 via an opening 51 of the insulating plate 50. By the vent member 40 to receive the pressure through the vent holes 34 of the internal terminal plate 30, it causes the internal terminal plate 30 to fracture at the thin part when the internal pressure of the battery case 15 exceeds the predetermined threshold. The vent member 40 has a downward projecting shape convex toward the inside of the battery case 15 in the normal state of use of the battery and inverts so as to take an upward projecting shape convex toward the outside of the battery case 15 when the internal pressure rises upon occurrence of abnormality in the battery. The vent member 40 has a structure which enables the inversion.

The vent member 40 includes a thin part 42 formed around its center part in the radial direction. The thin part 42 is, for example, formed into an annular shape so as to enclose the downward projection 41. The thin part 42 facilitates the aforementioned inversion when the internal pressure rises upon occurrence of abnormality in the battery and fractures when the internal pressure further rises. In the present embodiment, the upper surface (outer surface) of the vent member 40 is inclined so as to be convex toward the upside gradually from the inside of the thin part 42 toward the outside thereof in the radial direction. Moreover, the thickness of the thin part 42 becomes smaller gradually from the inside toward the outside in the radial direction. An annular groove may be formed on the thin part 42 or the outer end of the thin part 42 in the radial direction.

The vent member 40 is, for example, constituted of one metal plate including the downward projection 41 and the thin part 42. A preferable example of the metal plate is an aluminum alloy plate the main component of which is aluminum. The vent member 40 has a larger diameter than the internal terminal plate 30 and the insulating plate 50 and is fixed to the upper end part of the exterior can 16 via the gasket 23. Moreover, the vent member 40 includes a protruding part 43 obtained by causing and forming a part of its lower surface that is positioned on the outside of the thin part 42 in the radial direction to protrude toward the electrode assembly 14 side into an annular shape (refer to FIG. 1), and the internal terminal plate 30 and the insulating plate 50 are fitted into the inside of the protruding part 43.

As mentioned above, the insulating plate 50 intervenes between the internal terminal plate 30 and the vent member 40 and insulates the internal terminal plate 30 and the vent member 40 from each other at the portion except the connection portion between them. The insulating plate 50 has, for example, a diameter larger than the internal terminal plate 30 and smaller than the vent member 40 and is made of a resin which enables elastic deformation of protrusions 54 mentioned later. Preferable examples of material(s) of the resin include polyolefins such as polypropylene and high density polyethylene, vinyl chloride, polystyrene, and acrylonitrile-butadiene-styrene copolymers (ABS resins).

The insulating plate 50 includes a skirt part 53 protruding to the electrode assembly 14 side and formed into an annular shape along its outer end in the radial direction (refer to FIG. 1). The internal terminal plate 30 is fitted into the inside of the skirt part 53, and the lower surface of the insulating plate 50 comes into contact with the upper surface of the internal terminal plate 30. Moreover, the upper surface of the insulating plate 50 comes into contact with the lower surface of the vent member 40. Note that at the portion where the thin part 42 is formed, a gap exists between the lower surface of the vent member 40 and the upper surface of the insulating plate 50.

As exemplarily shown in FIG. 3 and FIG. 4, the insulating plate 50 is a disc-shaped component in which an opening 51 in a circular shape in plan view is formed at its center part in the radial direction and the plurality of vent holes 52 are formed along the circumferential direction around the opening 51. The opening 51 and the vent holes 52 are formed to penetrate the insulating plate 50 in the thickness direction. The opening 51 is formed in order to enable the separation part 32 of the internal terminal plate 30 and the downward projection 41 of the vent member 40 to be connected together, and has a dimension which enables the downward projection 41 to be inserted therethrough. The plurality of vent holes 52 are formed to be spaced from the opening 51 at a predetermined interval, between the opening 51 and the skirt part 53. While in the example shown in FIG. 4, four vent holes 52 long in the circumferential direction are formed, the shape and the number of vent holes 52 are not specially limited.

There are provided in the insulating plate 50 the protrusions 54 which are to deform toward the direction toward the vent member 40 when the separation part 32 of the internal terminal plate 30 is separated from the annular part 31 and the vent member 40 inverts so as to be convex toward the upside. The protrusions 54 are folded in the state of coming into contact with the vent member 40 and are formed so as to protrude toward the direction toward the vent member 40, that is, toward a space caused by the inversion of the vent member 40 when the vent member 40 inverts. As above, each of the protrusions 54 functions as the elastic deformation part which can make the elastic deformation. The protrusions 54 are arranged between the internal terminal plate 30 and the vent member 40 in the state of being pressed by the vent member 40. In other words, the protrusions 54 are arranged in the state where the pressing force acts on the vent member 40 toward the outside (upside) of the battery case 15. In other words, the protrusions 54 urge the separation part 32 via the vent member 40 toward the outside (upside) of the battery case 15.

The protrusions 54 resume their original shapes through elastic deformation when the pressing force from the vent member 40 comes not to act by the vent member 40 deforming so as to be convex toward the upside through the fracturing of the internal terminal plate 30. In the example shown in FIG. 4, before the sealing assembly 17 incorporates the insulating plate 50, the protrusions 54 stand substantially vertical relative to the planar direction of the insulating plate 50. The protrusions 54 protrude toward the upside more largely than the other portions of the insulating plate 50 and extend along the thickness direction of the insulating plate 50. By providing the protrusions 54 which are to protrude toward the upside through the fracturing of the internal terminal plate 30, the gap formed between the vent member 40 and the annular part 31 of the internal terminal plate 30 is maintained, and there can be reduced a possibility that the reconduction between the vent member 40 and the annular part 31 occurs.

The protrusions 54 are preferably formed in plural. The plurality of protrusions 54 are formed at portions which can come into contact with the lower surface of the vent member 40 to press the vent member 40 toward the upside in the normal state of use of the battery. In the present embodiment, the plurality of protrusions 54 are formed on the peripheral edge of the opening 51. The plurality of protrusions 54 are, for example, formed at substantially the same intervals along the circumferential direction of the insulating plate 50, and moreover, every two of the protrusions 54 are formed to line up in a radial direction of the insulating plate 50. In the example shown in FIG. 3, four protrusions 54 are formed at the same intervals on the peripheral edge of the opening 51. The number of protrusions 54 is not specially limited but is preferably two to twenty-one, still preferably three to eight.

As mentioned above, the protrusions 54 can be folded so as to be along the planar direction of the insulating plate 50 from their original shapes which are in the state where they stand in the thickness direction of the insulating plate 50. Moreover, the protrusions 54 have restoring force with which they resume their original shapes from the state where they are folded so as to be along the planar direction of the insulating plate 50. The protrusions 54 are pressed and folded by the lower surface of the vent member 40 when the sealing assembly 17 is assembled. In the present embodiment, there are formed recesses 55 at portions, on the upper surface of the insulating plate 50, that are adjacent to the protrusions 54, those housing the folded protrusions 54. The recesses 55 are depressions formed on the upper surface of the insulating plate 50 and are formed from the bases of the protrusions 54 toward the outside of the insulating plate 50 in the radial direction to have shapes and dimensions with which the protrusions 54 can be housed in those.

The shape of the protrusions 54 is not specially limited but a preferable example of the shape is a substantially rectangular shape. A length L1 (height) from the base to the tip of the protrusion 54 may be a length with which the gap, between the vent member 40 and the annular part 31 of the internal terminal plate 30, that arises due to the inversion of the vent member 40 can be maintained, and is, for example, 1.5 times to 5 times a thickness T of the insulating plate 50, or 1.8 times to 4 times, or 2 times to 3 times. The thickness T herein means the thickness of the insulating plate 50 at the portion that comes into contact with the upper surface of the internal terminal plate 30 and the lower surface of the vent member 40 and that any recess 55 or the like is not formed in. A specific example of the length L1 is 0.5 mm to 2 mm, or 0.7 mm to 1 mm. A length L2 of the protrusion 54 along the planar direction of the insulating plate 50 is, for example, 0.1 mm to 5 mm, or 0.5 mm to 2 mm. The thickness of the protrusion 54 is, for example, 10% to 60% of the thickness T.

There may be formed at the tip part of each protrusion 54 a tapered face which is inclined such that the length L1 shortens gradually from the outside of the insulating plate 50 toward the inside thereof in the radial direction. Moreover, a like tapered face may be formed also at the base part of the protrusion 54. Forming such a tapered face at the base part of the protrusion 54 facilitates the folding of the protrusion 54.

Figure 5:
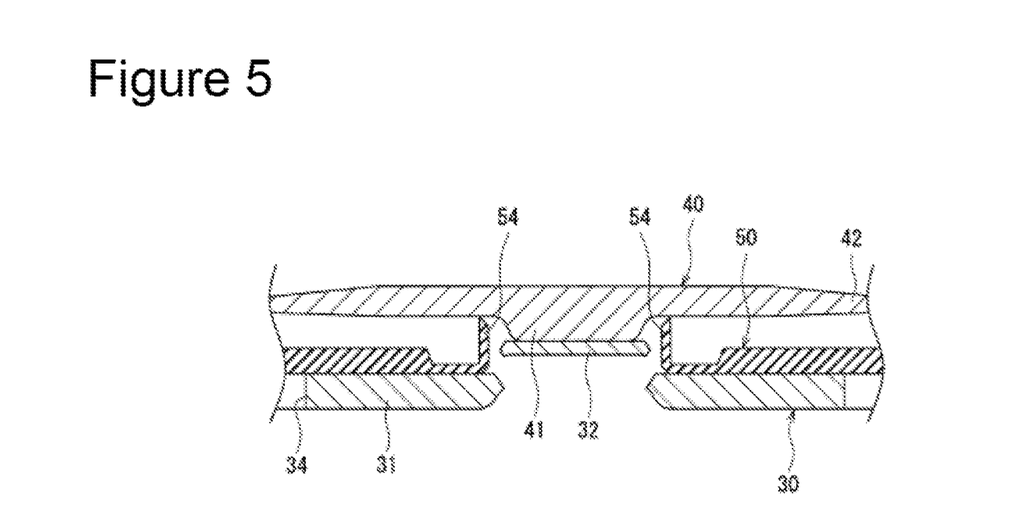
FIG. 5 is a view showing a state where an internal terminal plate constituting a sealing assembly which is an example of embodiments fractures.

FIG. 5 is a view showing a state where the internal terminal plate 30 fractures. As exemplarily shown in FIG. 5, when the internal pressure of the battery case 15 rises to exceed the predetermined threshold, the internal terminal plate 30 fractures at the portion where the groove 33 is formed, the separation part 32 is separated from the annular part 31, and the vent member 40 inverts so as to be convex toward the upside. In this stage, the plurality of protrusions 54 folded in the state where they come into contact with the lower surface of the vent member 40 and the pressing force acts resume their original shapes, which extend toward the upside, to protrude toward the upper space caused by the inversion of the vent member 40.

The plurality of protrusions 54 having protruded toward the upside intervene in the gap between the vent member 40 to which the external lead is connected and the annular part 31 of the internal terminal plate 30 to which the positive electrode lead 20 is connected, and maintain the state where the electric conduction between the vent member 40 and the annular part 31 is blocked. Accordingly, by using the sealing assembly 17 comprising the aforementioned configuration, the reconduction between the vent member 40 and the annular part 31 can be more securely prevented.

Notably, there may stand as to the insulating plate many acicular protrusions on the upper surface of the insulating plate in place of the substantially rectangular protrusions 54. Each of the articular protrusions is the elastic deformation part which is pressed by the vent member 40 to bend from its base and which resumes its original shape when the internal terminal plate 30 fractures. Otherwise, an elastic deformation component such as a foamed material and a porous material may be pasted on the upper surface of the insulating plate in place of the protrusions 54.

Figure 6:
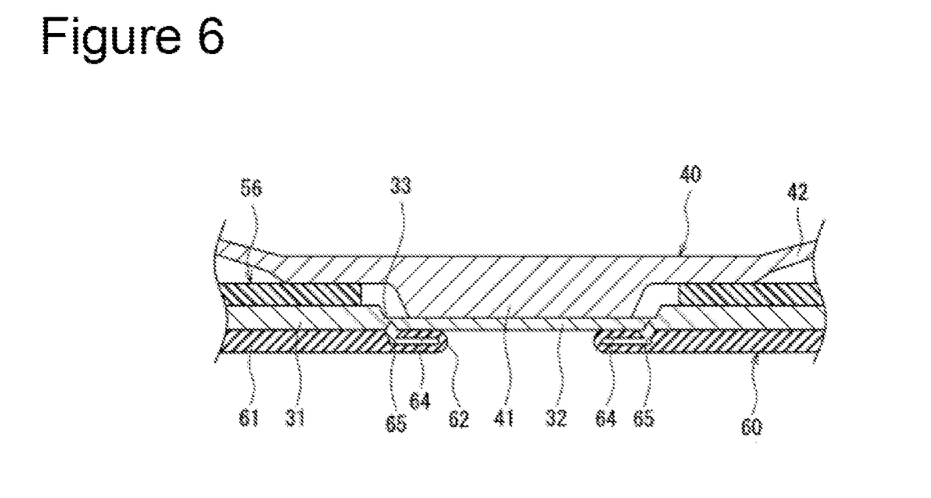
FIG. 6 is a sectional view of a sealing assembly and a gasket of another example of embodiments.
Figure 7:
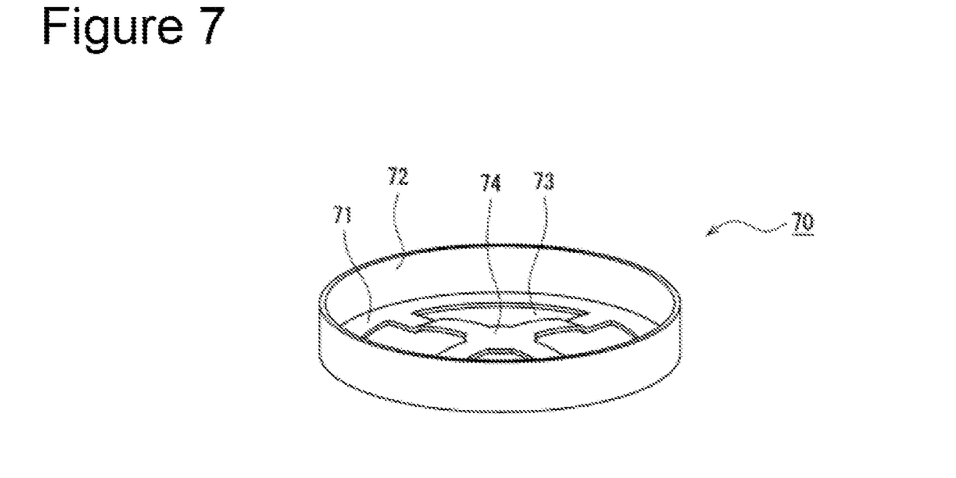
FIG. 7 is a view showing a modification of the gasket.
Figure 8:
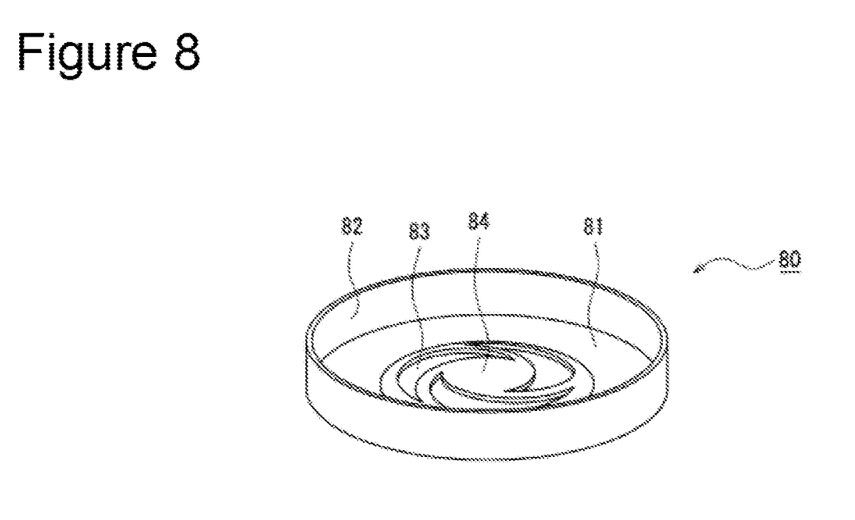
FIG. 8 is a view showing a modification of the gasket.

As exemplarily shown in FIG. 6 to FIG. 8, the aforementioned elastic deformation part may be provided in the gasket. The gasket 60 exemplarily shown in FIG. 6 is a bottomed cylindrical resin-made component including a disc-shaped bottom part 61 coming into contact with the lower surface of the internal terminal plate 30, and a sidewall part (not shown) formed into an annular shape along the outer peripheral edge of the bottom part 61, and has a structure in which protrusions 64 are provided each as the elastic deformation part. The sidewall part of the gasket 60 is interposed between the sealing assembly and the exterior can, insulates both components from each other, and seals the interior of the battery case. While in the example shown in FIG. 6, an insulating plate 56 not having an elastic deformation part is arranged between the internal terminal plate 30 and the vent member 40, an insulating plate having an elastic deformation part may be used in place of the insulating plate 56.

Vent holes 62 which are openings penetrating the bottom part 61 in the thickness direction are formed in the bottom part 61 of the gasket 60. The vent holes 62 are formed, for example, at positions overlapping with the separation part 32 and the vent holes 34 of the internal terminal plate 30 in the up-down direction. A plurality of protrusions 64 are formed on the peripheral edge of the vent hole 62 similarly to the protrusions 54. The plurality of protrusions 64 are formed, for example, at substantially the same intervals along the circumferential direction of the bottom part 61.

The protrusions 64 are folded in the state of coming into contact with the separation part 32 of the internal terminal plate 30 and are formed so as to protrude toward the direction toward the vent member 40 when the separation part 32 is separated from the annular part 31. Moreover, recesses 65 housing the folded protrusions 64 are formed at portions, on the upper surface of the bottom part 61, that are adjacent to the protrusions 64. When the internal pressure of the battery case 15 rises and the internal terminal plate 30 fractures at the portion where the groove 33 is formed, the vent member 40 inverts so as to be convex toward the upside, and the plurality of protrusions 64 protrude more toward the upside than the upper surface of the annular part 31. Thereby, the reconduction between the vent member 40 and the annular part 31 can be prevented.

A gasket 70 exemplarily shown in FIG. 7, similarly to the gasket 60, is a bottomed cylindrical resin-made component including a disc-shaped bottom part 71 coming into contact with the lower surface of the internal terminal plate 30, and a sidewall part 72 formed into an annular shape along the outer peripheral edge of the bottom part 71. Vent holes 73 are formed in the bottom part 71. The gasket 70 includes a projection 74, as the aforementioned elastic deformation part, that is formed in the center part of the bottom part 71 in the radial direction. The projection 74 comes into contact with the separation part 32 of the internal terminal plate 30 to be pressed into the inside of the battery case 15 and is formed so as to expand toward the direction toward the vent member 40 when the separation part 32 is separated from the annular part 31. In other words, the projection 74 urges the separation part 32 toward the outside (upside) of the battery case 15. The projection 74 does not necessarily expand toward the vent member 40 in the state of being pressed by the separation part 32.

The projection 74 is formed into a dome shape convex toward the upside and makes elastic deformation in the up-down direction. The projection 74 is depressed from the above by the internal terminal plate 30 in the normal state of use of the battery, and is to make elastic deformation to resume its original dome shape when the pressing force comes not to act through the fracturing of the internal terminal plate 30. The projection 74 has a shape in which bridge-like portions extending in the radial direction of the bottom part 71 intersect at the center part in the radial direction and the intersecting portion most expands. Notably, a spring structure may be formed in the bridge-like portion, and a coil-like spring structure may be formed in the intersecting portion.

A gasket 80 exemplarily shown in FIG. 8, similarly to the gaskets 60 and 70, is a bottomed cylindrical resin-made component including a disc-shaped bottom part 81 coming into contact with the lower surface of the internal terminal plate 30, and a sidewall part 82 formed into an annular shape along the outer peripheral edge of the bottom part 81. Vent holes 83 are formed in the bottom part 81. The gasket 80 includes a projection 84, similarly to the projection 74 of the gasket 70, that comes into contact with the separation part 32 of the internal terminal plate 30 to be pressed into the inside of the battery case 15 and is to expand toward the direction toward the vent member 40 when the separation part 32 is separated from the annular part 31. The projection 84 is formed into a spiral shape such that the center part of the bottom part 81 in the radial direction most expand, and is formed into a dome shape convex toward the upside as a whole.

Also when the gasket 70, 80 is used, the projection 74, 84 maintains the state where the electric conduction between the vent member 40 and the annular part 31 is blocked, the projection being to expand toward the upside when the separation part 32 is separated from the annular part 31 through the fracturing of the internal terminal plate 30.

REFERENCE SIGNS LIST 10 sealed battery, 11 positive electrode, 12 negative electrode, 13 separator, 14 electrode assembly, 15 battery case, 16 exterior can, 17 sealing assembly, 18, 19 insulating plate, 20 positive electrode lead, 21 negative electrode lead, 22 grooved part, 23, 60, 70, 80 gasket, 30 internal terminal plate, 31 annular part, 32 separation part, 33 groove, 34, 52 vent hole, 40 vent member, 41 downward projection, 42 thin part, 43 protruding part, 53 skirt part, 50, 56 insulating plate, 51, 62 opening, 54, 64 protrusion, 55, 65 recess, 61, 71, 81 bottom part, 72, 82 sidewall part, 73, 83 vent hole, 74, 84 projection

The invention claimed is:

1. A sealed battery comprising:
a battery case including a bottomed tubular exterior can, and a sealing assembly sealing an opening of the exterior can;
a gasket arranged between the exterior can and the sealing assembly; and
an electrode assembly including an electrode lead and housed in the battery case, wherein
the sealing assembly includes
a metal plate including an annular part that the electrode lead is electrically connected to, and a separation part that is to be separated from the annular part when an internal pressure of the battery case exceeds a predetermined threshold,
a vent member that is arranged more on an outside of the battery case than the metal plate and is connected to the separation part, and
an insulating plate that is arranged between the metal plate and the vent member and insulates the metal plate and the vent member from each other except for a connection portion between them, and
an elastic deformation part that is to deform in a direction toward the vent member when the separation part of the metal plate is separated from the annular part and is provided in the insulating plate or the gasket.

2. The sealed battery according to claim 1, wherein the elastic deformation part is a protrusion folded in a state of coming into contact with the vent member or the separation part of the metal plate, and the protrusion is formed so as to protrude toward the direction toward the vent member when the separation part is separated from the annular part.

3. The sealed battery according to claim 2, wherein the insulating plate or the gasket includes an opening, and a plurality of the protrusions are formed on a peripheral edge of the opening.

4. The sealed battery according to claim 1, wherein the elastic deformation part is a projection provided in the gasket, and the projection comes into contact with the separation part of the metal plate to be pressed into the inside of the battery case and is formed so as to expand toward the direction toward the vent member when the separation part is separated from the annular part.

* * * * *